Dec. 29, 1925. 1,567,908
W. I. BRIGHAM
TRANSPLANTING TROWEL
Filed Feb. 16, 1923
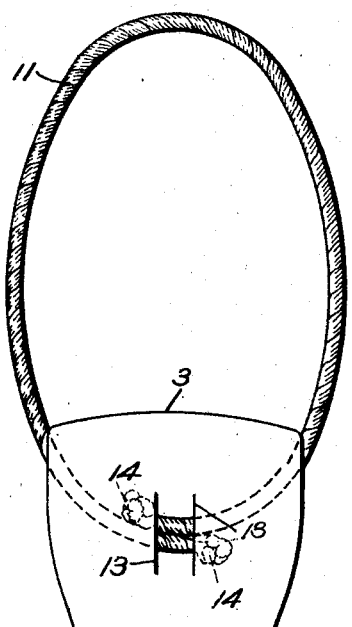
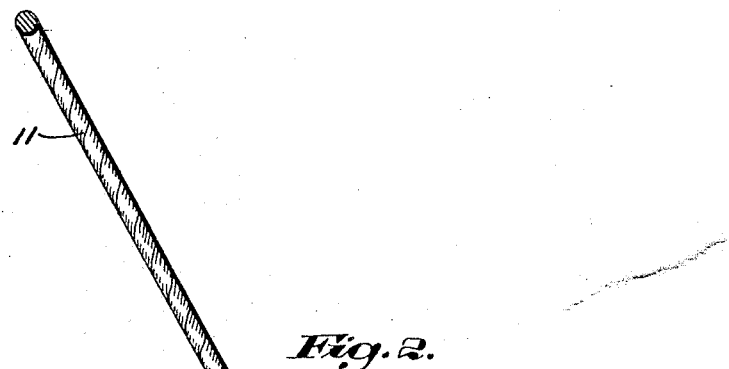
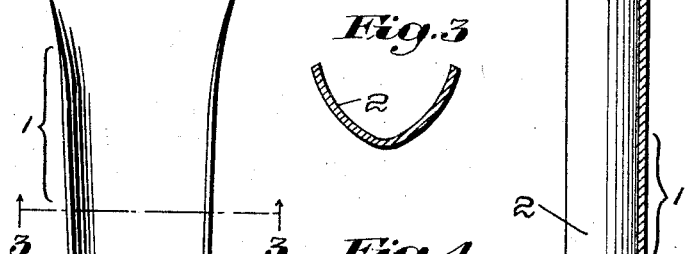
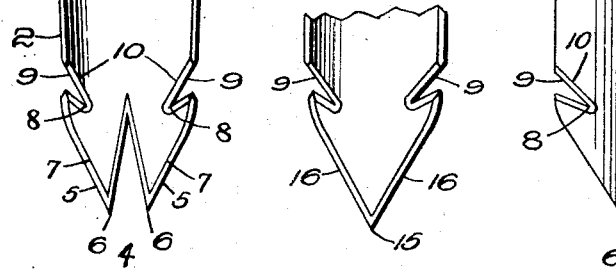
Inventor:
Walter I. Brigham
by Emery, Booth, Janney & Varney
Attys.

Patented Dec. 29, 1925.

1,567,908

UNITED STATES PATENT OFFICE.

WALTER I. BRIGHAM, OF FRAMINGHAM, MASSACHUSETTS.

TRANSPLANTING TROWEL.

Application filed February 16, 1923. Serial No. 619,508.

*To all whom it may concern:*

Be it known that I, WALTER I. BRIGHAM, a citizen of the United States, and a resident of Framingham, in the county of Middlesex and State of Massachusetts, have invented an Improvement in Transplanting Trowels, of which the following description, in connection with the accompanying drawings, is a specification, like characters on the drawings representing like parts.

This invention relates to garden tools and more particularly to a transplanting trowel sometimes termed a dibble. The objects of the invention will readily appear from the following description taken with the accompanying drawings of certain embodiments of my invention, the disclosure being for illustrative purposes and wherein:

Fig. 1 is a front elevation of the tool;

Fig. 2 is a longitudinal section of the same;

Fig. 3 is a transverse section on line 3—3 of Fig. 1 showing the trough-shape formation of the work member; and Fig. 4 is a detail view of a modified form of the earth-penetrating portion of the tool.

In the drawings, 1 is the body of the tool or implement which preferably consists of a work member 2. The work member 2 may be of any appropriate formation but herein it is shown trough-shaped at its lower end or at the portion which is intended to penetrate the earth so as to provide a receptacle for the plant that is to be transplanted by means of the tool. The lower end of the work member is pointed or sharpened to more easily enter the earth and for convenience said end is provided with a V-shaped notch 4 at the center thereof producing a bifurcated formation as indicated most clearly in Fig. 1, the sides of the trough-shaped member 2 being tapered at 5, 5 to cooperate with said notch in forming points 6, 6 which, as hereinbefore stated, facilitate the insertion or penetration of the work member into the soil wherein the plant is to be set. The sides of the V-shaped notch are preferably bevelled and form sharp cutting edges 7, 7 to enable the work end to function, when desired, as a cutter of roots or weeds or superfluous vegetation around the plants or, if desired, said tool may be used entirely as a weeder in places where plants are placed closely together and other forms of tools are not suitable for such purposes.

To add to the utility of the tool as a weeder the sides of the trough-shaped work member are provided with rearwardly disposed cutting edges 8, 8 produced by cutting notches or recesses preferably V-shaped, in the side of said work member at 9, 9. The upper edges of said V-shaped notches may likewise be bevelled to form cutting edges 10, the latter operating during the forward movements of the implement while the edges 8, 8 will operate during a backward or withdrawal movement of the tool from the soil or along the surface thereof.

An important function of the trowel is the transplanting of small plants like cabbage, celery, cauliflower and onion sets and it is particularly desirable to construct the instrument about the size of a man's hand so that, by placing the palm of his hand against the handle and his fingers against the open side of the trough-shaped work member and against the plant which is thereby held within said trough-shaped member with its roots extending downwardly in the vicinity of the pointed earth penetrating member, the earth into which the plant is to be inserted may easily be penetrated by the work member forming a hole large enough to receive the roots of the plant, all of which during said penetrating action, are protected fully by the trough-shaped work member in cooperation with the operator's fingers.

In order that this operation may more easily be effected the tool, as hereinbefore stated, has preferably been constructed from a single piece of material and the upper end thereof has been convexly formed and bent rearwardly so as to produce the smooth palm-rest indicated at 3, the whole implement being designed to fit comfortably within the operator's hand.

After the earth has been penetrated and a hole made therein large enough to receive the plant it is desirable to withdraw the work member and tamp the soil firmly about the roots of the plant but where a large number of such plants are to be transplanted the tamping operation will be greatly interfered with if a hold be retained upon the tool or considerable time will be wasted by having to lay aside and pick up the tool each time. To eliminate this waste of time a flexible band or loop 11 is attached in any appropriate manner to the body of the tool and is of sufficient size or length to permit the insertion of the operator's hand and loop over his wrist thereby to support the implement in juxta or substantially operating relation to the palm of the hand so that after the insertion of the plant in the hole prepared therefor the hold upon said tool may be released and the tamping operation carried out. By reason of this loop said tool, when the operator's grip has been released therefrom, will not drop to the ground but will be suspended in a handy or convenient position so that only a slight rearward movement of the operator's fingers will be necessary to regain a grip upon the same and restore it to operating position in readiness for the next plant transfer.

Obviously the loop may be made of any appropriate flexible material and herein it is shown constructed of cord, the ends whereof are attached to the body of the tool in any appropriate manner. In the present example a portion or strip 12 of the body 2 is pressed rearwardly producing slits 13, 13 through which the ends 14, 14 of the cord are inserted in overlapping relation after which said strip 12 is pressed back to pinch said ends and thereby securely hold them in place.

From the securing means 12 opposite sides of the loop 11 formed by said cord pass upwardly into engagement with opposite edge portions of the handle 3 whereby said sides are held separated as will be seen by referring to Fig. 1 when the implement or tool is suspended by said loop thereby preventing twisting of the loop when the tool is not in use. It is, however, to be understood, that the manner of engagement between said loop and handle is not limited to that disclosed.

Although I have described the work end of the tool as being bifurcated by means of the slot 4 I do not wish to limit myself to this construction and in Fig. 4 I have illustrated a modified form wherein the earth penetrating portion is merely pointed at 15, the sides 16, 16 preferably being bevelled to provide cutting edges which facilitate the penetration of the tool through the soil and also assist in destroying or uprooting weeds growing among the plants.

From the foregoing it will be obvious that a very strong and durable tool will result owing in part to the fact that it is of channel or trough shaped formation throughout and further that it is constructed preferably from a single piece of material.

While I have herein shown and described merely for illustrative purposes certain embodiments of my invention and have disclosed and discussed in detail the construction and arrangement incidental to such disclosures it is distinctly to be understood that the invention is not limited to the mere details or relative arrangement of parts nor to the specific application shown.

Claims:

1. A garden tool comprising a work member and handle formed from a single piece of sheet material and a loop attached to said handle for suspending the tool when not in use in juxtarelation to the hand of the operator.

2. A dibble comprising a work member and handle formed from a single piece of sheet material and means for suspending said implement from the wrist of the operator when not in use, in juxtarelation to the hand of said operator.

3. A dibble comprising a work member and handle formed from a single piece of sheet material and means for suspending said implement from the wrist of the operator substantially in operating relation to the hand of said operator.

4. A garden implement comprising a pointed trough-shaped work member adapted to penetrate the earth, a rounded portion on said implement for receiving pressure from the palm of the hand of the operator and a loop for encircling the wrist of the operator to suspend said implement substantially in operating relation to the operator's hand.

5. In a garden tool a transplating member having a pointed earth penetrator provided with outer cutting edges, the sides of said member having rearwardly disposed root cutting edges adapted to function during backward movements of said tool.

6. In a garden tool a transplating member having a notched earth penetrator, the outer sides whereof constitute root cutting edges and rearwardly disposed cutting edges upon at least one side of said member for operating during withdrawing movements of said tool to cut roots.

7. A dibble comprising a notched transplanting member having root cutting edges at the sides of said notch, a palm engaging portion formed integral with said member and a loop for suspending said dibble from the wrist of the operator with said palm engaging portion in juxtarelation to the palm of the operator's hand when the dibble is not in use.

8. A trowel comprising a transplating member and a hand engaging portion formed from sheet material, a portion of said material adjacent to said hand-engaging portion being partially detached, and a flexible element secured to said sheet material by said partially detached portion to suspend said dibble from the wrist of the operator substantially in operating relation thereto.

9. In a hand tool a work member and a loop attached thereto for suspending said tool in juxtarelation to the hand.

10. In a trowel a work member and a handle formed integral with said work member and bent laterally to fit the palm of the hand.

11. In a trowel a trough-shaped work member and a handle formed integral with said work member and bent laterally and convexly curved to fit the palm of the operator's hand.

12. In a hand tool, a work member, a loop attached thereto for suspending said tool in juxtarelation to the hand and means to retain the sides of said loop separated to prevent twisting thereof when said tool is suspended by said loop.

13. In a trowel, a work member, a handle formed integral with said work member having a laterally bent portion to fit the palm of the hand and a loop secured to said work member and extending upwardly into engagement with opposite edge portions of said handle whereby said loop is prevented from twisting while in suspension.

14. A hand tool comprising an earth-penetrating work member, a handle therefor, and a wrist encircling loop to suspend said tool substantially in operating relation to the hand of the operator when not in use.

In testimony whereof, I have signed my name to this specification.

WALTER I. BRIGHAM.

Certificate of Correction.

It is hereby certified that in Letters Patent No. 1,567,908, granted December 29, 1925, upon the application of Walter I. Brigham, of Framingham, Massachusetts, for an improvement in "Transplanting Trowels," errors appear in the printed specification requiring correction as follows: Page 2, lines 100, 106, and 122, claims 5, 6, and 8, for the misspelled word " transplating " read *transplanting;* and that the said Letters Patent should be read with these corrections therein that the same may conform to the record of the case in the Patent Office.

Signed and sealed this 26th day of January, A. D. 1926.

[SEAL.] WM. A. KINNAN,
*Acting Commissioner of Patents.*